US011886138B2

(12) United States Patent
Nishiyama et al.

(10) Patent No.: US 11,886,138 B2
(45) Date of Patent: Jan. 30, 2024

(54) IMAGE FORMING APPARATUS

(71) Applicant: BROTHER KOGYO KABUSHIKI KAISHA, Nagoya (JP)

(72) Inventors: Hideshi Nishiyama, Owariasahi (JP); Yasuhiro Suzuki, Nagoya (JP); Yusuke Ikegami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 471 days.

(21) Appl. No.: 16/721,582

(22) Filed: Dec. 19, 2019

(65) Prior Publication Data

US 2020/0201223 A1 Jun. 25, 2020

(30) Foreign Application Priority Data

Dec. 20, 2018 (JP) ................................ 2018-238808

(51) Int. Cl.
*G03G 15/23* (2006.01)
*G03G 15/00* (2006.01)
(Continued)

(52) U.S. Cl.
CPC ........... *G03G 15/231* (2013.01); *B65H 29/14* (2013.01); *B65H 29/58* (2013.01);
(Continued)

(58) Field of Classification Search
CPC ........ B65H 29/14; B65H 29/58; B65H 85/00; G03G 15/231; G03G 15/6529; G03G 15/6552; G03G 2215/00586
See application file for complete search history.

(56) References Cited

U.S. PATENT DOCUMENTS

| | | | | |
|---|---|---|---|---|
| 6,112,047 A * | 8/2000 | Kato | ...................... | B65H 29/00 271/302 |
| 2003/0116911 A1* | 6/2003 | Kanai | .................... | B65H 29/14 271/303 |

(Continued)

FOREIGN PATENT DOCUMENTS

| | | |
|---|---|---|
| JP | H07-261471 A | 10/1995 |
| JP | H9-309655 A | 12/1997 |

(Continued)

OTHER PUBLICATIONS

Office Action issued by the Japanese Patent Office dated Nov. 15, 2022, Japanese Patent Application No. 2018-238808.

*Primary Examiner* — Thomas A Morrison
(74) *Attorney, Agent, or Firm* — Baker Botts L.L.P.

(57) ABSTRACT

An image forming apparatus includes a main casing including an image forming unit and a discharge tray, and an optional device configured to be removably attached to the main casing. The main casing includes a conveying path through which a sheet is conveyed from the image forming unit, a discharge path through which the sheet is conveyed toward one of the discharge tray and the optional device, the discharge path diverging from the conveying path, and a return path including a first path through which the sheet is conveyed temporarily out of the main casing via an opening formed in the main casing, and a second path through which the sheet is conveyed toward the image forming unit. The first path diverges from the conveying path. The second path diverges from the first path. The optional device is disposed closer to the discharge tray than the opening.

17 Claims, 9 Drawing Sheets

(51) Int. Cl.
*B65H 29/58* (2006.01)
*B65H 29/14* (2006.01)

(52) U.S. Cl.
CPC ..... *G03G 15/6529* (2013.01); *G03G 15/6552* (2013.01); *G03G 2215/00586* (2013.01)

(56) References Cited

U.S. PATENT DOCUMENTS

| | | | | |
|---|---|---|---|---|
| 2010/0025928 A1* | 2/2010 | Yamamoto | ............. | B65H 29/14 271/302 |
| 2017/0355541 A1 | 12/2017 | Koyama | | |
| 2018/0267450 A1 | 9/2018 | Kosuge et al. | | |
| 2018/0362283 A1* | 12/2018 | Yamamoto | ............. | B65H 29/60 |

FOREIGN PATENT DOCUMENTS

| | | | |
|---|---|---|---|
| JP | 2015-20873 | A | 2/2015 |
| JP | 2016-071224 | A | 5/2016 |
| JP | 2017-222455 | A | 12/2017 |
| JP | 2018-150152 | A | 9/2018 |

* cited by examiner

IMAGE FORMING APPARATUS

CROSS-REFERENCE TO RELATED APPLICATION

This application claims priority from Japanese Patent Application No. 2018-238808 filed on Dec. 20, 2018, the content of which is incorporated herein by reference in its entirety.

TECHNICAL FIELD

Aspects of the disclosure relate to an image forming apparatus that allows an optional device to be attached thereto.

BACKGROUND

A known image forming apparatus, such as a laser printer, includes switchback rollers configured to switch back a sheet for duplex printing. In the known image forming apparatus, an image is formed by an image forming unit on one surface of a sheet. Thereafter, the sheet is switched back or returned by the switchback rollers to a return path through which the sheet is conveyed back to the image forming unit for printing on the other surface of the sheet. The sheet having an image formed on the other surface may be discharged onto a discharge tray through a discharge path.

The known image forming apparatus allows an optional discharge unit to be attached thereto after the cover that partially defines the return path is removed. In a case where the discharge unit is attached to the image forming apparatus, a portion of a path defined in the discharge unit is connected to the return path defined in a main casing of the image forming apparatus, so that the portion of the path defined in the discharge unit serves as a portion of the return path. In a case where the discharge unit is not attached to the image forming apparatus, the cover is attached to the image forming apparatus and a path defined in the cover serves as a portion of the return path.

SUMMARY

A portion of the return path is defined by a guide provided at the optional discharge unit. This may lead to increase in size of the discharge unit and an image forming unit to which the discharge unit is attached, as well as increase in cost of the discharge unit.

In a case where the image forming apparatus is configured to allow optional devices, such as a sorter and a finisher, other than the discharge unit to be removably attached thereto, increase in size and cost of the optional devices may occur.

Aspects of the disclosure provide an image forming apparatus configured to allow an optional device to be attached thereto and to perform duplex printing. The image forming apparatus may prevent or reduce increase in size and cost of the optional device.

According to aspects of the disclosure, an image forming apparatus may comprise a main casing including an image forming unit and a discharge tray, and an optional device configured to be removably attached to the main casing. The main casing may include a conveying path through which a sheet is conveyed from the image forming unit, a discharge path through which the sheet is conveyed toward one of the discharge tray and the optional device, the discharge path diverging from the conveying path, and a return path including a first path through which the sheet is conveyed temporarily out of the main casing via an opening formed in the main casing, and a second path through which the sheet is conveyed toward the image forming unit. The first path may diverge from the conveying path. The second path may diverge from the first path. The optional device may be disposed closer to the discharge tray than the opening.

According to aspects of the disclosure, the optional device may be disposed closer to the discharge tray than the opening. The sheet to be switched back for duplex printing may be conveyed along the first path temporarily out of the main casing through the opening that may be located further to the rear than the optional device. The optional device may not cover the opening, which may prevent or reduce increase in size and cost of the optional device.

DETAILED DESCRIPTION

Figure 1:
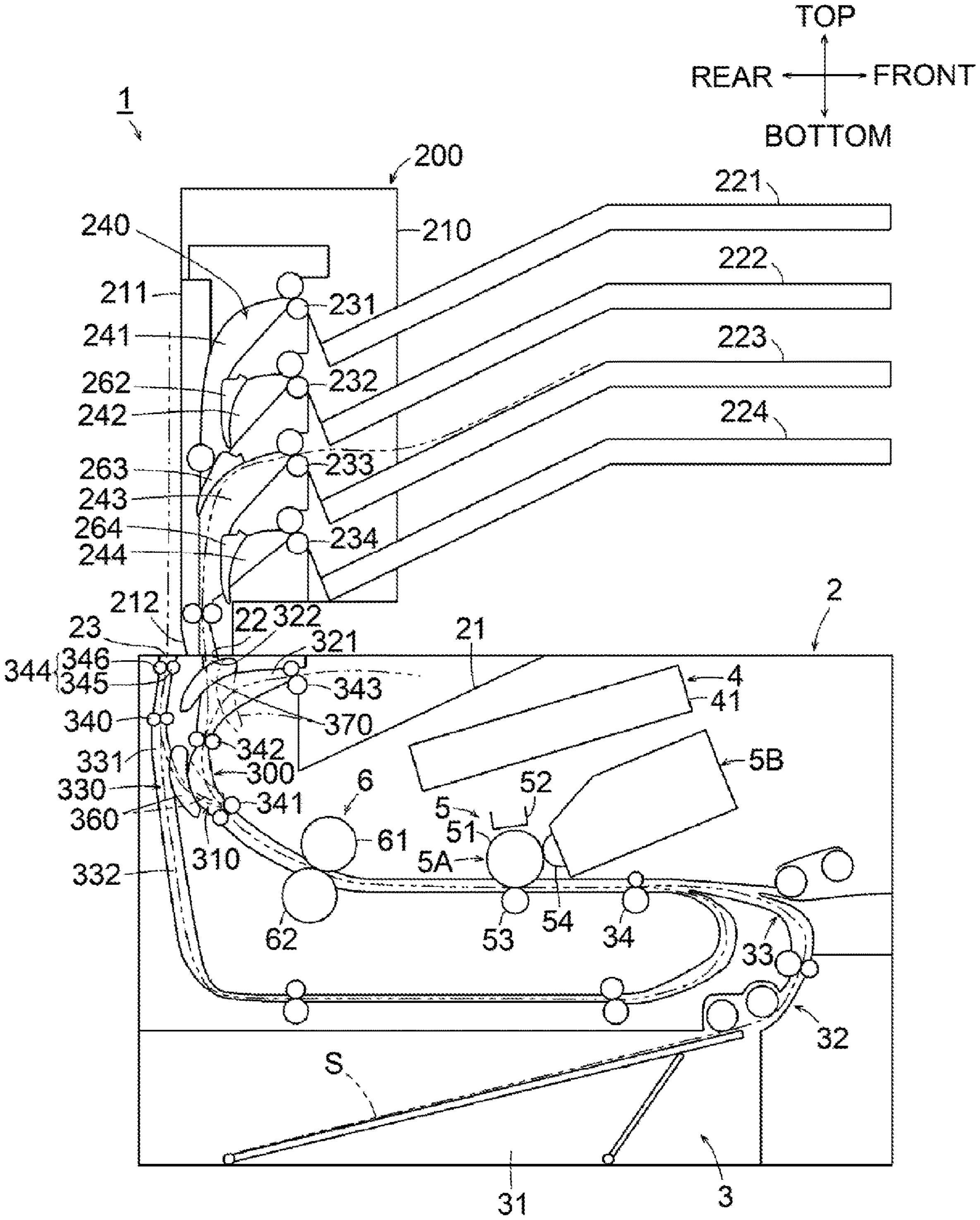
FIG. 1 is an illustrative cross-sectional side view of an image forming apparatus, to which a discharge unit is attached, in an illustrative embodiment according to one or more aspects of the disclosure.

In the following description, directional terminology such as “up/top,” “down/bottom,” “front,” “rear,” “left,” “right” etc., as labelled in the drawings, may be used in conjunction with an orientation of an image forming apparatus 1 in which it is intended to be used by a user. With respect to the page of FIG. 1, the right side may be defined as the front of the image forming apparatus 1; the left side may be defined as the rear of the apparatus 1; out of the page may be defined as the left of the apparatus 1; into the page may be defined as the right of the apparatus 1; the upper side may be defined as the top of the apparatus 1; and the lower side may be defined as the bottom of the apparatus 1. Because the disclosed components can be positioned in a number of different orientations, the directional terminology is used for purposes of illustration and is in no way limiting.

[Configuration of Image Forming Apparatus]

As depicted in FIG. 1, the image forming apparatus 1 according to an illustrative embodiment is a laser color printer configured to form an image on each surface of a sheet S. The image forming apparatus 1 includes a main casing 2. The image forming apparatus 1 allows an optional device, e.g., a discharge unit 200, to be attached above the main casing 2. Examples of the optional device may include a sorter and a finisher.

The main casing 2 includes a sheet feed unit 3, an image forming unit 4, and a conveying unit 300. The main casing 2 includes a main discharge tray 21 disposed at an upper surface of the main casing 2. The main discharge tray 21 is configured to receive a sheet S having an image formed thereon. The main discharge tray 21 is disposed above the image forming unit 4.

The sheet feed unit 3 is configured to feed a sheet S toward the image forming unit 4. The sheet feed unit 3 includes a sheet cassette 31 configured to hold a stack of one or more sheets S, a feed mechanism 32 including rollers configured to feed the sheets S, a feed path 33 through which the sheets S fed from the sheet cassette 31 are conveyed toward the image forming unit 4, and a registration roller pair 34.

The sheets S held in the sheet cassette 31 are separated from one another by the feed mechanism 32. The separated sheet S is conveyed through the feed path 33. The sheet S is then conveyed to the image forming unit 4 through the registration roller pair 34. The registration roller pair 34 is disposed at an end portion of the feed path 33. The registration roller pair 34 is configured to correct the skew of the sheet S and adjust a timing of image forming on the sheet S by contacting a leading end of the sheet S and temporarily stopping the sheet S before the sheet S is fed to the image forming unit 4.

The image forming unit 4 is configured to form an image on the sheet S. The image forming unit 4 is disposed above the sheet cassette 31. The image forming unit 4 includes a scanner unit 41, a process cartridge 5 including a photosensitive drum 51, and a fixing unit 6.

The scanner unit 41 is disposed in an upper portion of the main casing 2. The scanner unit 41 is configured to emit laser light based on image data, to a surface of the photosensitive drum 51 through a polygon mirror, lenses, and reflecting mirrors. The laser light scans across the surface of the drum 51 at high speed.

The process cartridge 5 includes a drum unit 5A, and a developing cartridge 5B configured to be attached to the drum unit 5A. The drum unit 5A includes the photosensitive drum 51 configured to have an electrostatic latent image thereon, a charger 52, and a transfer roller 53. The developing cartridge 5B contains toner therein and includes a developing roller 54 configured to supply the toner to the photosensitive drum 51, a supply roller, a blade, and an agitator.

In the process cartridge 5, the surface of the rotating photosensitive drum 51 is uniformly charged by the charger 52. The surface of the photosensitive drum 51 is then exposed to the laser light from the scanner unit 41 that scans the surface of the drum 51 at high speed, thereby discharging the exposed area of the surface of the photosensitive drum 51. This may create an electrostatic latent image on the exposed area of the surface of the photosensitive drum 51 based on image data.

The toner in the developing cartridge 5B is supplied by the rotating developing roller 54 to the electrostatic latent image on the photosensitive drum 51, thereby forming a toner image on the surface of the photosensitive drum 51. The toner image on the photosensitive drum 51 is then transferred onto the sheet S conveyed between the photosensitive drum 51 and the transfer roller 53.

The fixing unit 6 is disposed behind the process cartridge 5. The fixing unit 6 includes a heat roller 61 including a heater, and a pressure roller 62 configured to hold the sheet S between the heat roller 61 and the pressure roller 62. The fixing unit 6 is configured to thermally fix the toner image transferred to the sheet S, while the sheet S passes through a portion between the heat roller 61 and the pressure roller 62.

The conveying unit 300 is configured to discharge the sheet S conveyed from the image forming unit 4, to the main discharge tray 21 or the discharge unit 200. The conveying unit 300 is also configured to return a sheet S, which is conveyed from the image forming unit 4, to the image forming unit 4.

The discharge unit 200 includes optional trays 221-224 that are arranged in line in an up-down direction. The discharge unit 200 is configured to sort the sheets S conveyed from the main casing 2 onto the optional trays 221-224.

In one example, the discharge unit 200 includes, in addition to the optional trays 221-224, a unit casing 210 configured to support the optional trays 221-224, discharge rollers 231-234 disposed in correspondence with the respective optional trays 221-224, and a discharge unit path 240 through which the sheet S conveyed from the main casing 2 is guided to the optional trays 221-224.

The discharge unit path 240 has a first unit path 241 and second unit paths 242-244. The first unit path 241 extends to the uppermost optional tray 221. The second unit paths 242-244 diverge from the first unit path 241 and extend to the other optional trays 222-224. Pivotable members 262-264 are disposed at positions where the second unit paths 242-244 diverge from the first unit path 241. Each of the pivotable members 262-264 is configured to pivot, thereby changing a conveying direction of the sheet S.

<Configuration of Conveying Unit>

Figure 2:
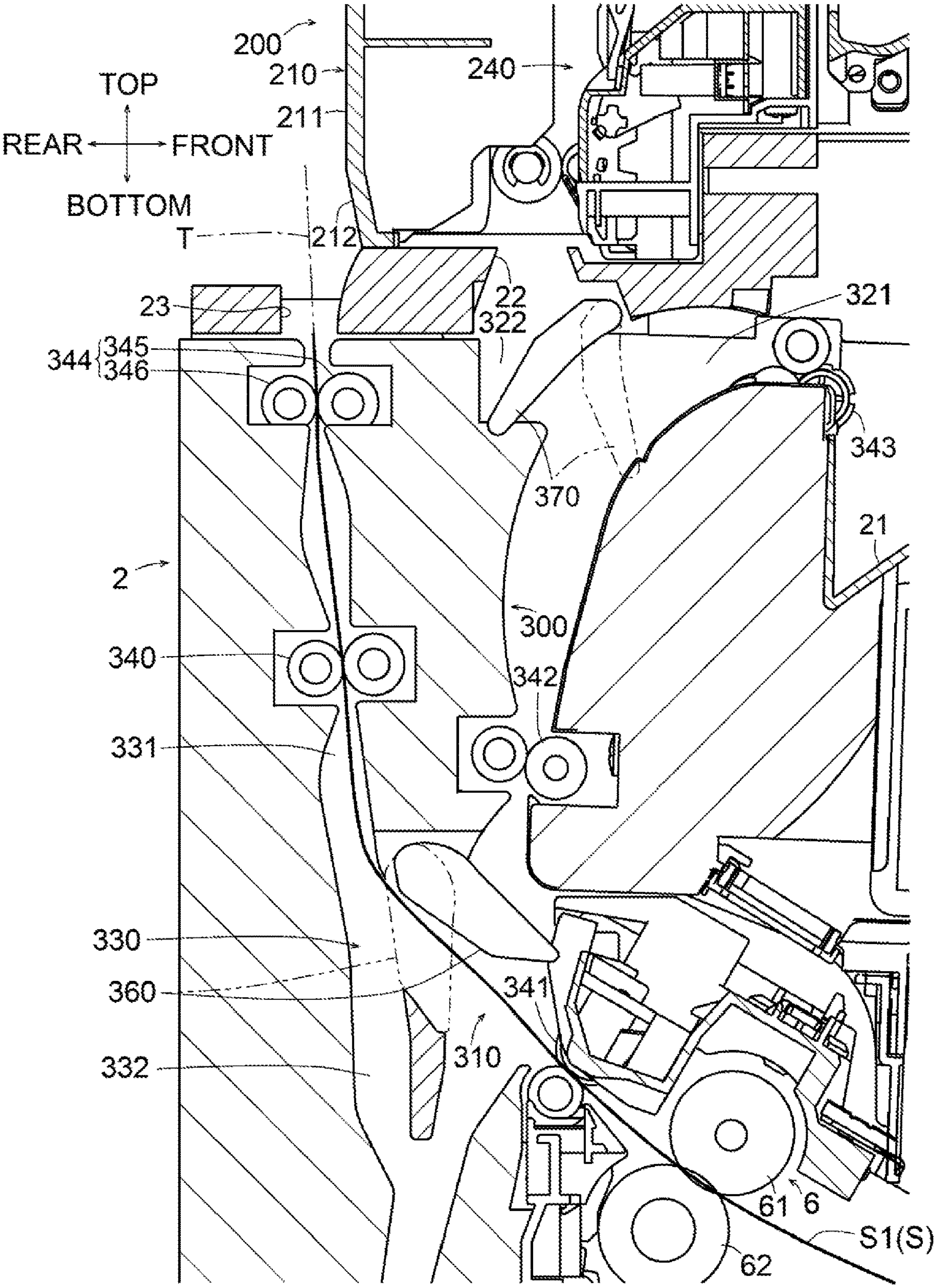
FIG. 2 is a partially enlarged view of a conveying unit of the image forming apparatus, when a sheet is conveyed to a return path, according to the first exemplary embodiment of the present invention.

Configuration of the conveying unit 300 will now be described. As depicted in FIG. 2, the conveying unit 300 includes a conveying path 310, a discharge path, e.g., a first discharge path 321 and a second discharge path 322, and a return path 330. The sheet S conveyed from the fixing unit 6 is guided through the conveying path 310. The first discharge path 321 diverges from the conveying path 310 to guide the sheet S to the main discharge tray 21. The second discharge path 322 diverges from the first discharge path 321 to guide the sheet S to the discharge unit path 240. The return path 330 diverges from the conveying path 310 to guide the sheet S back to the image forming unit 4. The conveying unit 300 has a first opening 22, a second opening 23, a first flapper 360, and a second flapper 370. The first opening 22 and the second opening 23 are located at upper rear portions of the main casing 2, and allow the sheet S to pass therethrough. The first flapper 360 and the second flapper 370 are configured to change a path for the sheet S.

The conveying path 310 extends rearward and upward from a position behind the fixing unit 6. Disposed in the conveying path 310 is a first conveying roller 341 configured to convey the sheet S.

The first discharge path 321 extends upward and frontward from an upper end of the conveying path 310. A conveyance path includes the conveying path 310 and the first discharge path 321. The conveyance path extends away from the fixing unit 6 and curves toward the main discharge tray 21, such that the conveyance path makes a U-turn. Disposed in the first discharge path 321 are a second conveying roller 342 and a discharge roller 343.

The second conveying roller 342 is configured to convey the sheet S transported from the conveying path 310 to the first discharge path 321. In the illustrative embodiment, the second conveying roller 342 is disposed at a curved end portion (e.g., a rearmost end portion) of the U-shaped conveyance path defined by the conveying path 310 and the first discharge path 321. The discharge roller 343 is disposed at an end of the first discharge path 321 and configured to discharge the sheet S to the main discharge tray 21.

The second discharge path 322 extends upward from a portion of the first discharge path 321 between the second conveying roller 342 and the discharge roller 343. The second discharge path 322 has an upper end connected to or communicating with the first opening 22.

The return path 330 includes a first path 331 and a second path 332. The first path 331 is located further to the rear than the first discharge path 321 and the second discharge path 322 and extends upward from the conveying path 310. The first path 331 provides a passage to an exterior of the main casing 2 through the second opening 23. The second path 332 diverges from the first path 331 and extends downward toward the image forming unit 4.

In the first path 331, a third conveying roller 340 and a conveying roller pair 344 are disposed. The conveying roller pair 344 includes a first roller 345 and a second roller 346. The third conveying roller 340 is configured to convey the sheet S transported from the conveying path 310 to the first path 331. In the illustrative embodiment, the third conveying roller 340 is disposed below the conveying roller pair 344. The conveying roller pair 344 is disposed near the second opening 23 above the third conveying roller 340.

The third conveying roller 340 and the conveying roller pair 344 are each configured to rotate in forward and reverse directions. The sheet S conveyed along the first path 331 may be conveyed temporarily out of the main casing 2 through the second opening 23 as the third conveying roller 340 and the conveying roller pair 344 rotate in the forward direction. As the third conveying roller 340 and the conveying roller pair 344 rotate in the reverse direction, the sheet S may be conveyed back into the main casing 2.

The second path 332 extends downward from the first path 331. The second path 332 then bends or curves frontward, as depicted in FIG. 1, and further extends between the image forming unit 4 and the sheet cassette 31. The second path 332 curves upward at a position below (e.g., under) the registration roller pair 34 and merges with the feed path 33 in front of the registration roller pair 34.

As depicted in FIG. 2, the first flapper 360 is pivotally attached to the main casing 2 and is configured to change a conveying direction of the sheet S at a diverging point where the return path 330 diverges from the conveying path 310. When the sheet S conveyed from the fixing unit 6 is to be guided to the first discharge path 321, the first flapper 360 is in a discharge position (as indicated by a phantom line in FIG. 2) in which the return path 330 is closed. When the sheet S conveyed from the fixing unit 6 is to be guided to the return path 330, the first flapper 360 pivots frontward from the discharge position to a return position (as indicated by solid lines in FIG. 2) in which the return path 330 is opened and the first discharge path 321 is closed.

The second flapper 370 is pivotally attached to the main casing 2 and is configured to change a conveying direction of the sheet S at a diverging point where the second discharge path 322 diverges from the first discharge path 321. When the sheet S conveyed by the second conveying roller 342 is to be guided to the discharge roller 343 along the first discharge path 321, the second flapper 370 is in a first discharge position (as depicted in FIG. 2 by a solid line) in which the second discharge path 322 is closed. When the sheet S conveyed by the second conveying roller 342 is to be guided to the second discharge path 322, the second flapper 370 pivots frontward from the first discharge position to a second discharge position (as depicted in FIG. 2 by a phantom line) in which the second discharge path 322 is open and the first discharge path 321 is closed.

[Position Where Discharge Unit is Attached]

The discharge unit 200 is attached to the main casing 2 relative to the conveying unit 300 such that the discharge unit path 240 communicates with the second discharge path 322 via the first opening 22.

The discharge unit 200 is disposed closer to the discharge tray 21 than the second opening 23. In one example, a rear surface 211 and an inclined surface 212 of the unit casing 210 are disposed further to the front than the second opening 23. The rear surface 211 extends in the up-down direction and the left-right direction. The rear surface 211 is an example of a side surface of the discharge unit 200 closer to the second opening 23. The inclined surface 212 is disposed adjacent to the second opening 23. Additionally, the inclined surface 212 is angled, relative to the conveying direction of the sheet S, in a direction away from the discharge unit 200 from a bottom end of the inclined surface 212 toward a top end of the inclined surface 212. In other words, the inclined surface 212 is inclined from the bottom to the top such that a top portion of the inclined surface 212 extends farther toward the rear than a bottom portion of the inclined surface 212. In the illustrative embodiment, the inclined surface 212 extends frontward and downward from a lower end portion of the rear surface 211 to a position corresponding to a front end portion of the second opening 23.

The discharge unit 200 is disposed further to the front than the second opening 23. The sheet S to be switched back (e.g., to be returned to the image forming unit 4) for duplex printing is conveyed along the first path 331 temporarily out of the main casing 2 through the second opening 23 that is located further to the rear than the rear surface 211 of the discharge unit 200. The discharge unit 200 does not cover the second opening 23. This configuration may prevent or reduce increases in size and costs of the discharge unit 200.

The discharge unit 200 includes the inclined surface 212. The inclined surface 212 may guide the sheet S that is being conveyed along the first path 331 temporarily out of the main casing 2 through the second opening 23 and is leaning toward the discharge unit 200.

<Nip Tangent Line>

A nip tangent line T is tangent to a nip between the first roller 345 and the second roller 346 of the conveying roller pair 344. The nip tangent line T extends in the sheet conveying direction. The nip tangent line T includes a portion that extends from the nip toward the opening 23 away from the rear surface 211 of the discharge unit 200. In short, the nip tangent line T extends in an upper-rear direction. The nip tangent line T may extend in the sheet conveying direction in parallel to the rear surface 211 of the discharge unit 200. In other words, the first roller 345 and the second roller 346 are disposed such that the nip tangent line T does not cross the discharge unit 200.

This configuration may prevent or reduce the contact of the sheet S to the discharge unit 200 when the sheet S is conveyed along the first path 331 temporarily out of the main casing 2 through the second opening 23, thereby reducing resistance applied to the sheet S being conveyed.

<Cover>

Figure 4:
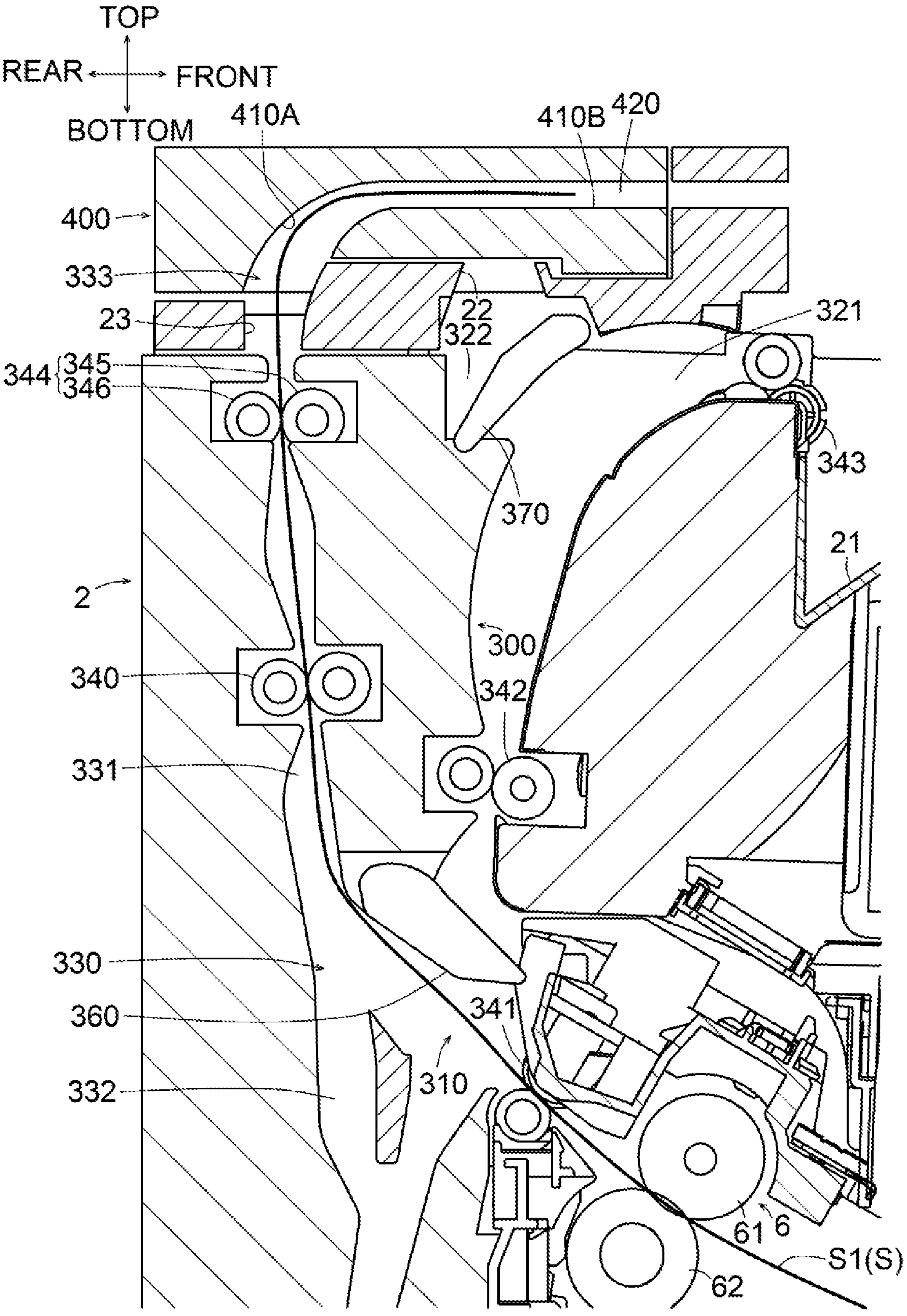
FIG. 4 is an enlarged view of the conveying unit, with a cover attached to a casing of the image forming apparatus, illustrating a sheet is conveyed to the return path.

As depicted in FIG. 4, the image forming apparatus 1 includes a cover 400 that is detachably attached to the main casing 2 when the discharge unit 200 is not attached to the main casing 2. The cover 400 has a first state in which the cover 400 covers the openings, e.g., the second opening 23, (e.g., the cover 400 is attached to the main casing 2), and a second state in which the cover 400 uncovers the openings (e.g., the cover 400 is removed from the main casing 2 and the discharge unit 200 is attachable). In the first state, the cover 400 covers the first opening 22 and the second opening 23 from above and is configured to guide the sheet S, which is conveyed through the second opening 23, toward a position above the main discharge tray 21.

The cover 400 includes guide surfaces 410A and 410B. When the cover 400 is attached to the main casing 2 (e.g., in the first state), each of the guide surfaces 410A and 410B extends upward from a position in a vicinity of a rear end of the second opening 23. Each guide surface 410A and 410B further extends frontward such that a portion of each guide surface 410A and 410B is located further to the front than the second opening 23. The guide surfaces 410A and 410B define a cover path 420. The cover path 420 may not necessarily be defined by both of the guide surfaces 410A and 410B but be defined by one guide surface 410A that defines an outer end of the cover path 420. The path defined by one guide surface 410A may guide the sheet S.

When the discharge unit 200 is removed from the main casing 2, and the cover 400 is attached to the main casing 2, a third discharge path 333 is defined by the first path 331 and the cover path 420, and forms a portion of the return path 330. The third discharge path 333 extends along the first discharge path 321 such that a portion of the third discharge path 333 is located behind the first discharge path 321. In one example, the third discharge path 333 is formed into a "U" shape. The third discharge path 333 extends rearward from the conveying path 310 along a curved portion of a U-shaped conveyance path including the conveying path 310 and the first discharge path 321, and further extends frontward toward the main discharge tray 21.

When the discharge unit 200 is removed from the main casing 2, and the cover 400 is attached to the main casing 2, the sheet S that is to be switched back for duplex printing may be conveyed temporarily to a position above the main discharge tray 21.

[Operations of Image Forming Apparatus]

<For Discharging Sheet to Main Discharge Tray>

To discharge a sheet S having an image formed by the image forming unit 4 onto the discharge tray 21, the first flapper 360 is pivotally moved rearward to the discharge position, and the second flapper 370 is pivotally moved rearward to the first discharge position as depicted in FIG. 1, thereby opening the first discharge path 321 and closing the return path 330 and the second discharge path 322. In this state, the sheet S conveyed from the image forming unit 4 is guided to the first discharge path 321 through the conveying path 310, and is discharged to the main discharge tray 21 by the discharge roller 343.

<For Discharging Sheet to Optional Tray>

To discharge a sheet S having an image formed by the image forming unit 4 onto the optional tray 221-224 of the discharge unit 200, the first flapper 360 is pivotally moved rearward to the discharge position, thereby opening an entrance of the first discharge path 321 and closing the return path 330. The second flapper 370 is pivotally moved frontward to the second discharge position, thereby opening the second discharge path 322 and closing a portion of the first discharge path 321 downstream of the second discharge path 322 in the conveying direction of the sheet S.

In this state, the sheet S conveyed from the image forming unit 4 is guided to the first discharge path 321 through the conveying path 310. The sheet S is then guided to the discharge unit path 240 of the discharge unit 200, through the second discharge path 322.

In the discharge unit 200, the pivotable members 262-264 may pivot to open the second unit path 242-244 corresponding to the desirable optional tray 221-224. The sheet S being transported in the discharge unit path 240 may be conveyed toward the desirable optional tray 221-224 and discharged on the optional tray 221-224 by the corresponding discharge roller 231-234.

[Performing Duplex Printing with Discharge Unit Attached]

To perform duplex printing with the discharge unit 200 attached to the main casing 2, the first flapper 360 is pivotally moved frontward to the return position, as depicted in FIG. 2, thereby closing the first discharge path 321 and opening the return path 330. As described above, the sheet S1 has an image formed on one surface thereof by the image forming unit 4, and a sheet S2 has images formed on both surfaces thereof by the image forming unit 4. The sheet S2 precedes the sheet S1.

The sheet S1 is conveyed from the conveying path 310 to the first path 331 of the return path 330. The sheet S1 conveyed to the first path 331 is guided toward the third conveying roller 340 and the conveying roller pair 344. The sheet S1 is conveyed temporarily out of the main casing 2 by the third conveying roller 340 and the conveying roller pair 344 that rotate in the forward direction, through the second opening 23. The portion of the nip tangent line T of the conveying roller pair 344 extends, in the sheet conveying direction, away from the rear surface 211 of the discharge unit 200. This may prevent the sheet S from contacting the discharge unit 200, reducing resistance applied to the sheet S being conveyed.

Figure 3:
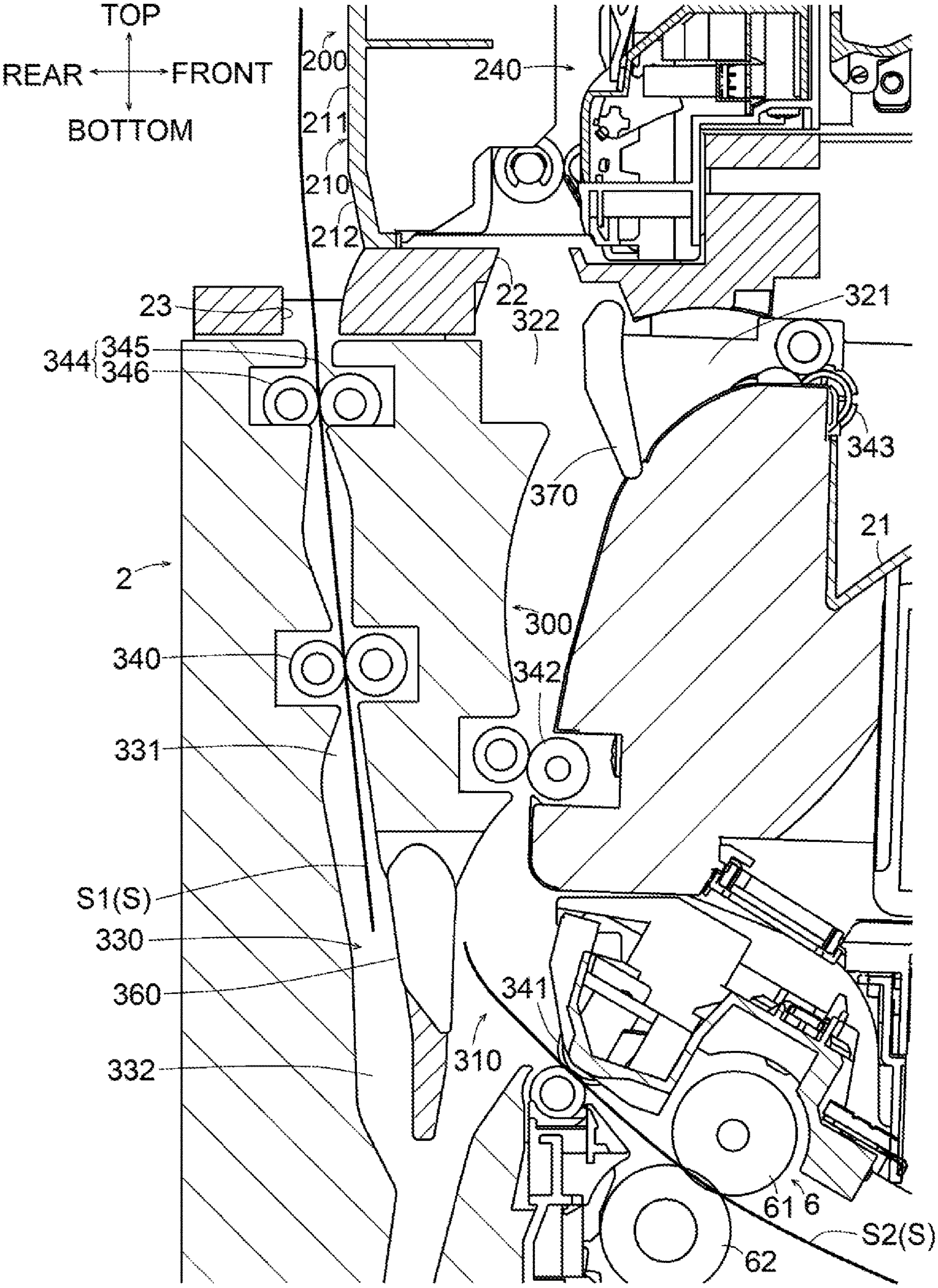
FIG. 3 is an enlarged cross-sectional view of the conveying unit of FIG. 1, illustrating a duplex-printed sheet is conveyed to a first discharge path.

As depicted in FIG. 3, when a tailing end of the sheet S1 conveyed in the return path 330 exits the conveying path 310, the first flapper 360 pivots rearward to the discharge position. When viewed from the conveying path 310, the first discharge path 321 is open and the entrance of the return path 330 is closed.

When the tailing end of the first sheet S1 conveyed in the return path 330 reaches the diverging point of the second path 332 from the first path 331, the third conveying roller 340 and the conveying roller pair 344 rotate reversely. This may cause the sheet S1 to be reversely conveyed toward the second path 332 with the trailing end of the sheet S1 as the leading end. The sheet S1 is conveyed to the image forming unit 4 where the sheet S1 is turned upside down.

After the trailing end of the sheet S1 exits the conveying path 310 and the first flapper 360 has moved to the discharge position, the sheet S2 (e.g., duplex printed sheet S2) having images formed on both surfaces thereof is conveyed from the fixing unit 6. The sheet S2 is then conveyed through the conveying path 310 toward the first discharge path 321 and is discharged onto the main discharge tray 21 or the optional tray 221-224 of the discharge unit 200.

When the image forming apparatus 1 executes duplex printing, the sheet S1 having an image formed on one surface thereof may be conveyed to the image forming unit 4 through the return path 330 without passing through the first discharge path 321. The duplex printed sheet S2 may be discharged onto the main discharge tray 21 or the optional tray 221-224 of the discharge unit 200 immediately after the sheet S1 is conveyed to the return path 330. This configuration may reduce a printing time interval, as compared with a configuration in which the sheet S is partially discharged by the discharge roller 343 out of the main casing 2 and is conveyed back to the image forming unit 4.

[Performing Duplex Printing with Cover Attached]

As depicted in FIG. 4, the cover 400 can be used by attaching to the main casing 2 when the discharge unit 200 is not attached to the main casing 2.

To perform duplex printing with the cover 400 attached to the main casing 2, the first flapper 360 is pivotally moved frontward to the return position, thereby closing the first discharge path 321 and opening the return path 330 including the third discharge path 333. The second flapper 370 is pivotally moved to the first discharge position, thereby closing the second discharge path 322.

In this state, the sheet S1 is conveyed from the conveying path 310 to the third discharge path 333 of the return path 330. The sheet S1 conveyed to the third discharge path 333 is conveyed by the third conveying roller 340 and the conveying roller pair 344 that rotate in the forward direction and is conveyed frontward while being guided by the guide surface 410A of the cover 400.

Figure 5:
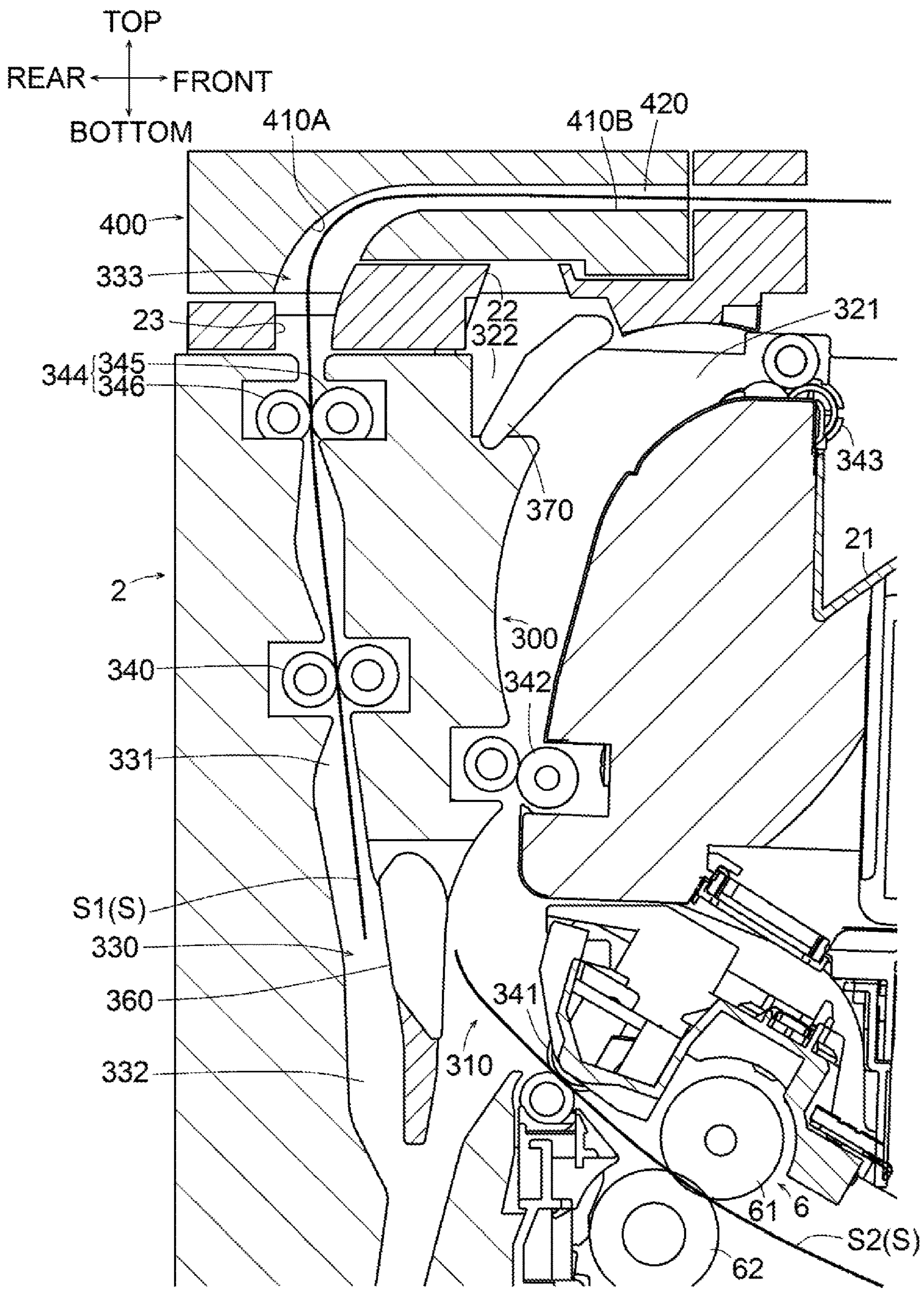
FIG. 5 is an enlarged view of the conveying unit with the cover attached to the casing, illustrating a duplex-printed sheet is conveyed toward a first discharge path.

As depicted in FIG. 5, when the tailing end of the sheet S1 exits the conveying path 310, the first flapper 360 pivots rearward to the discharge position. When viewed from the conveying path 310, the first discharge path 321 is open and the entrance of the return path 330 is closed.

When the tailing end of the first sheet S1 conveyed in the return path 330 reaches the diverging point of the second path 332 from the first path 331, the third conveying roller 340 and the conveying roller pair 344 rotate reversely. This may cause the sheet S1 to be reversely conveyed toward the second path 332 with the trailing end of the sheet S1 as the leading end. The sheet S1 is conveyed to the image forming unit 4 where the sheet S1 is turned upside down.

After the trailing end of the sheet S1 exits the conveying path 310 and the first flapper 360 has moved to the discharge position, the sheet S2 is conveyed from the fixing unit 6. The sheet S2 is conveyed from the conveying path 310 toward the first discharge path 321 and is discharged to the main discharge tray 21.

When the image forming apparatus 1 executes duplex printing without attaching the discharge unit 200 to the main casing 2, the sheet S1, which has an image printed on one surface thereof, is conveyed, without passing through the first discharge path 321, to the return path 330. Thereafter, the sheet S2, which has images printed on both surfaces thereof, is conveyed to the first discharge path 321. This may reduce a printing time interval.

First to fourth modifications of the illustrative embodiment will now be described referring to FIGS. 6-8. Like numerals in the drawings denote like components and the detailed description of those components described above is omitted, with respect to FIGS. 6-8.

First Modification

Figure 6:
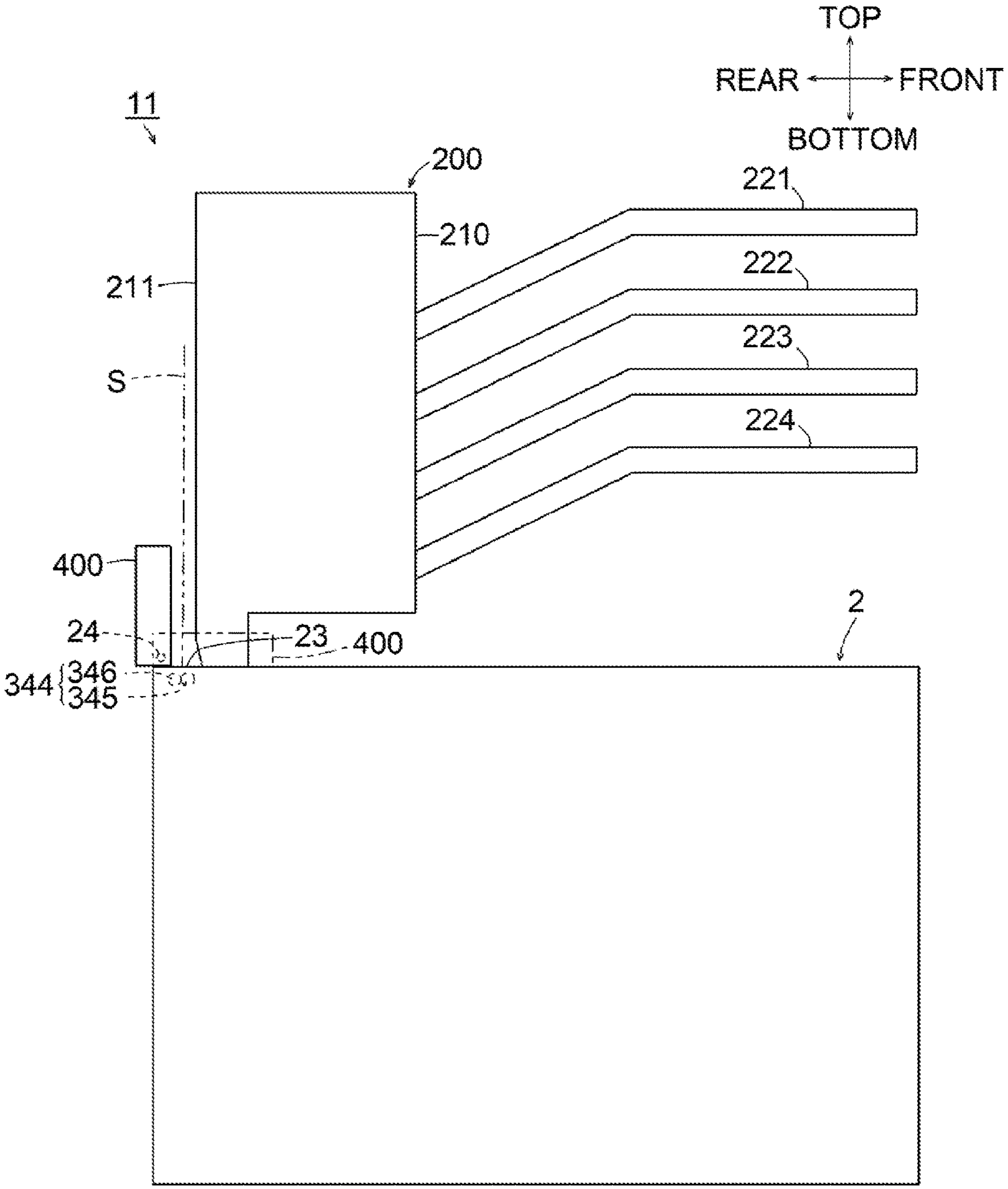
FIG. 6 is a side view of an image forming apparatus in a first modification according to one or more aspects of the disclosure, illustrating a general configuration of the image forming apparatus.

FIG. 6 is a side view of an image forming apparatus 11 in a first modification according to one or more aspects of the disclosure, illustrating a general configuration of the image forming apparatus 11. In the first modification, the main casing 2 pivotally supports the cover 400. The image forming apparatus 11 includes a pivot shaft 24 that supports the cover 400 to allow the cover 400 to pivot between a first state (as indicated by a phantom line in FIG. 6) and a second state (as indicated by a solid line in FIG. 6). At the first state, the cover 400 covers the openings. At the second state, the cover 400 uncovers or opens the openings. The pivot shaft 24 is located at a portion of the upper surface of the main casing 2 further to the rear than the second opening 23. The pivot shaft 24 extends in the left-right direction. The pivot shaft 24 may be disposed at the cover 400. Since the cover 400 is attached to the image forming apparatus 11 via the pivot shaft 24, the cover 400 may not be lost.

The discharge unit 200 may be attached to the main casing 2, with the cover 400 being in the second state. When the discharge unit 200 attached to the image forming apparatus 11, the cover 400 in the second state faces the rear surface 211 of the discharge unit 200 with the second opening 23 between the cover 400 and the discharge unit 200. In short, the cover 400 in the second state is held in position along the up-down direction. When the discharge unit 200 is attached to the main casing 2, the sheet S that is being conveyed temporarily out of the main casing 2, is guided by the cover 400 at the second state. Using the cover 400 as a guide, the sheet S that is being conveyed toward an exterior of the main casing 2 through the second opening 23 may be stably conveyed while flex of the sheet S is prevented or reduced.

Second Modification

Figure 7:
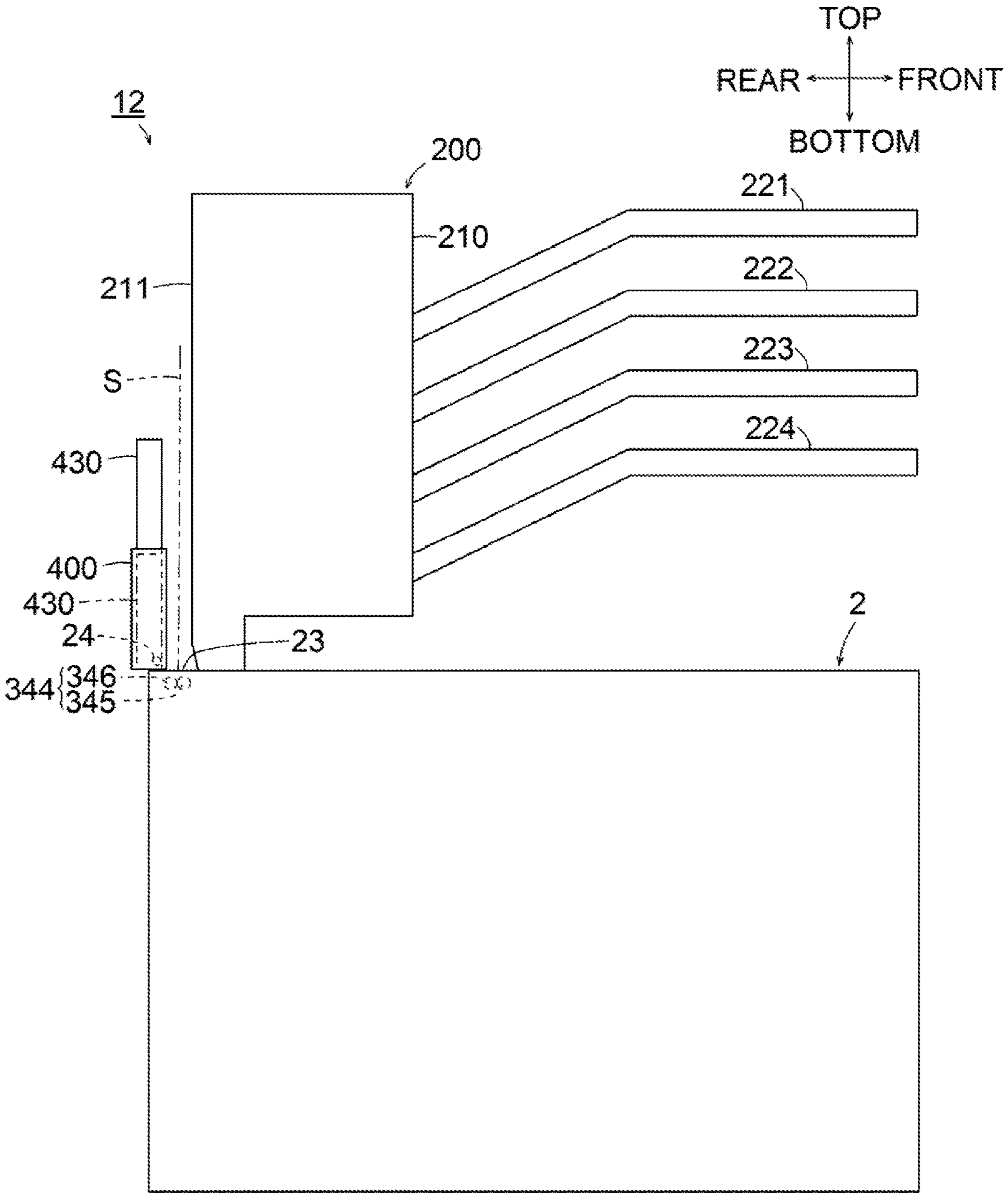
FIG. 7 is a side view of an image forming apparatus in a second modification according to one or more aspects of the disclosure, illustrating a general configuration of the image forming apparatus.

FIG. 7 is a side view of an image forming apparatus 12 in a second modification according to one or more aspects of the disclosure, illustrating a general configuration of the image forming apparatus 12. In the second modification, a cover 400 includes a first extension 430. In FIG. 7, the first extension 430 is added to the configuration of the first modification. The first extension 430 has a U-shaped cross section, and is slidably supported by a groove formed in the cover 400. When the cover 400 is in the first state, the first extension 430 is located within the cover 400, as indicated by a phantom line. When the cover 400 is in the second state, the first extension 430 is held at an extended position where the first extension 430 is pulled upward from the cover 400, as indicated by a solid line.

The first extension 430 in the second state, where the first extension 430 is pulled upward from the cover 400, faces the rear surface 211 of the discharge unit 200. In short, the cover 400 in the second state and the first extension 430 are held in position along the up-down direction. When the discharge unit 200 is attached to the main casing 2, the sheet S that is being conveyed temporarily out of the main casing 2 through the second opening 23, is guided by the cover 400 in the second state and the first extension in the extended position. Using the first extension 430, as well as the cover 400 as a guide, a long sheet S being conveyed toward an exterior of the main casing 2 through the second opening 23 may be stably conveyed while flex of the sheet S is prevented or reduced. The first extension 430 extended from the cover 400 may guide the sheet S in a relatively long area.

Third Modification

Figure 8:
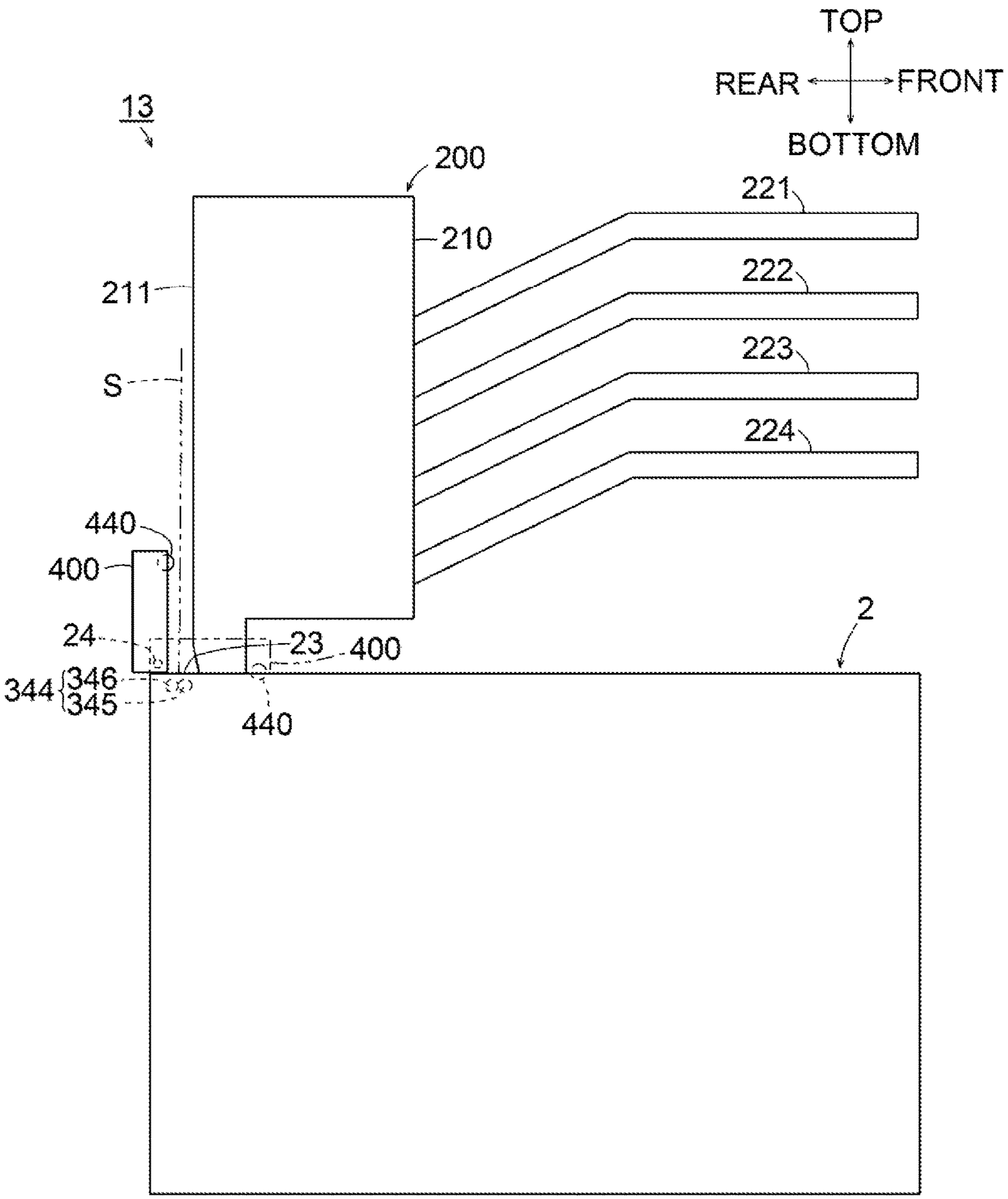
FIG. 8 is a side view of an image forming apparatus in a third modification according to one or more aspects of the disclosure, illustrating a general configuration of the image forming apparatus.

FIG. 8 is a side view of an image forming apparatus 13 in a third modification according to one or more aspects of the disclosure, illustrating a general configuration of the image forming apparatus 13. In the third modification, a cover 400 includes a roller 440. In FIG. 8, the roller 440 is added to the configuration of the first modification. The roller 440 is rotatably supported by the cover 400 such that, when the cover 400 is in the second state, a portion of the roller 440 protrudes frontward from the upper end portion of the cover 400.

When the cover 400 is in the second state and the discharge unit 200 is attached to the main casing 2, the roller 440 faces the rear surface 211 of the discharge unit 200. The sheet S that is being conveyed temporarily out of the main casing 2 through the second opening 23, may contact and be guided by the roller 440. This may reduce resistance applied to the sheet S being conveyed.

In the first to the third modifications, the cover 400 in the second state extends along the up-down direction. In some embodiments, the cover 400 in the second state may be, for example, inclined rearward. In the first to the third modifications, the cover 400 is pivotally supported by the main casing 2. In some embodiments, the cover 400 may be removably attached to the main casing 2. The cover 400 may be configured to change between the first state and the second state by changing attachment positions of the cover 400 to the main casing 2.

Fourth Modification

Figure 9:
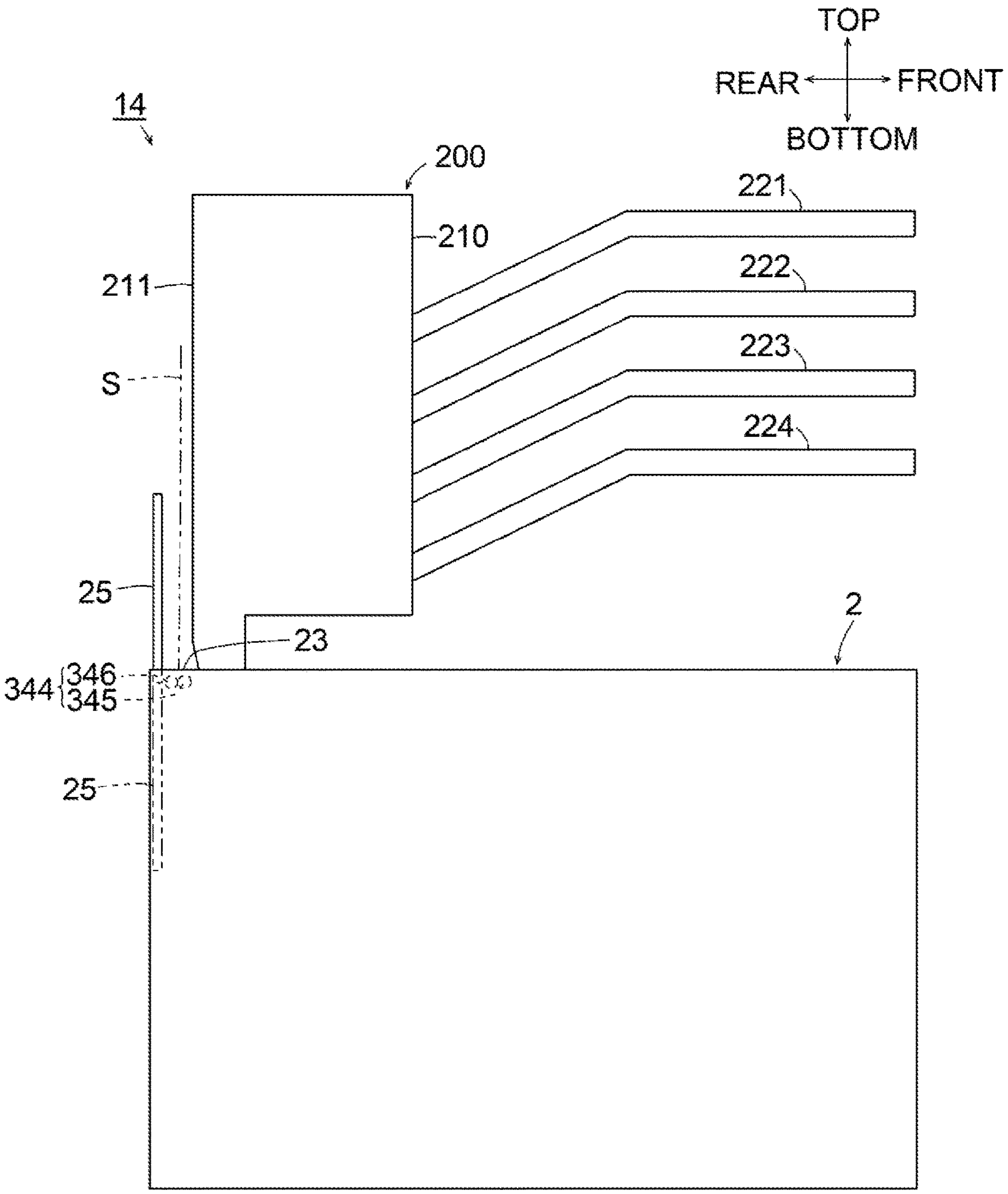
FIG. 9 is a side view of an image forming apparatus in a fourth modification according to one or more aspects of the disclosure, illustrating a general configuration of the image forming apparatus.

FIG. 9 is a side view of an image forming apparatus 14 in a fourth modification according to one or more aspects of the disclosure, illustrating a general configuration of the image forming apparatus 14. In the fourth modification, a main casing 2 according to the fourth modification includes a second extension 25. The second extension 25 has a plate shape and is slidably supported by a groove formed in the main casing 2. The groove is located further toward the rear than the second opening 23. The second extension 25 is configured to slidably move between a retracted position as indicated by a phantom line in FIG. 9 and an extended position as indicated by a solid line in FIG. 9. At the retracted position, the second extension 25 is located inside the main casing 2. At the extended position, the second extension 25 is pulled upward from the upper surface of the main casing 2.

When the discharge unit 200 is attached to the main casing 2, the second extension 25 pulled upward from the main casing 2 faces the rear surface 211 of the discharge unit 200 with the second opening 23 between the second extension 25 and the discharge unit 200. When the discharge unit 200 is attached to the main casing 2, the sheet S that is being conveyed temporarily out of the main casing 2 through the second opening 23, may be guided by the second extension 25. This configuration may allow the sheet S to be stably conveyed while flex of the sheet S being conveyed toward an exterior of the main casing 2 through the second opening 23, is prevented or reduced.

Each of the elements or components which have been described in the illustrative embodiment and modifications may be used in combination where possible.

What is claimed is:

1. An image forming apparatus, comprising:

a main casing including an image forming unit and a discharge tray; and an optional device configured to be removably attached to the main casing, the optional device having a first side and a second side that is opposite from the first side, the first side extending in a first direction, wherein the main casing includes:

a conveying path through which a sheet is conveyed from the image forming unit;

a discharge path through which the sheet is conveyed toward one of the discharge tray in a discharge direction and the optional device, the discharge path diverging from the conveying path; and a return path including a first path through which a portion of the sheet is conveyed temporarily out of the image forming apparatus and along the first side of the optional device in the first direction via an opening formed in the main-casing, and a second path through which the sheet is conveyed toward the image forming unit, the first path diverging from the conveying path, the second path diverging from the first path, and wherein when the optional device is removably attached to the main casing, the optional device is disposed downstream to the opening in the discharge direction and includes an optional discharge tray that extends from the second side.

2. The image forming apparatus according to claim 1, further comprising a conveying roller pair disposed at the first path, wherein a nip tangent line tangent to a nip of the conveying roller pair extends in a conveying direction of the sheet in parallel to a side surface of the optional device.

3. The image forming apparatus according to claim 1, further comprising a conveying roller pair disposed at the first path, wherein a nip tangent line tangent to a nip of the conveying roller pair extends in a conveying direction of the sheet, and includes a portion that extends from the nip toward the opening away from a side surface of the optional device.

4. The image forming apparatus according to claim 3, wherein the nip tangent line does not cross the optional device.

5. The image forming apparatus according to claim 1, wherein the optional device includes an inclined surface disposed adjacent to the opening and is angled, relative to the conveying direction, in a direction away from the optional device from a bottom end of the inclined surface toward a top end of the inclined surface.

6. The image forming apparatus according to claim 1, further comprising a cover configured, when the optional device is removed from the main casing, to selectively change between a first state in which the cover covers the opening and a second state in which the cover uncovers the opening and the optional device is attachable, wherein the cover in the first state defines a guide surface configured to guide the sheet conveyed through the first path to a position above the discharge tray.

7. The image forming apparatus according to claim 6, wherein the cover in the second state faces the optional device with the opening between the cover and the optional device.

8. The image forming apparatus according to claim 7, wherein the cover includes a first extension extendable from the cover, the first extension facing the optional device when the cover is in the second state.

9. The image forming apparatus according to claim 7, wherein the cover includes a roller at a position facing the optional device when the cover is in the second state.

10. The image forming apparatus according to claim 1, wherein the main casing includes a second extension extendable from the main casing, the second extension facing the optional device with the opening between the second extension and the optional device.

11. The image forming apparatus according to claim 6, further comprising a pivot shaft that supports the cover to allow the cover to pivotally move between the first state and the second state.

12. An image forming apparatus, comprising:
a main casing including an image forming unit and a discharge tray; and
an optional device configured to be removably attached to the main casing,
wherein the main casing includes:
a conveying path through which a sheet is conveyed from the image forming unit;
a discharge path through which the sheet is conveyed toward one of the discharge tray in a discharge direction and the optional device, the discharge path diverging from the conveying path; and
a return path including a first path through which the sheet is conveyed temporarily out of the main casing via an opening formed in the main casing, and a second path through which the sheet is conveyed toward the image forming unit, the first path diverging from the conveying path, the second path diverging from the first path, and
wherein the optional device is disposed downstream to the opening in the discharge direction; and
wherein the image forming apparatus further comprises:
a cover configured, when the optional device is removed from the main casing, to selectively change between a first state in which the cover covers the opening and a second state in which the cover uncovers the opening and the optional device is attachable; and
a pivot shaft that supports the cover to allow the cover to pivotally move between the first state and the second state, and
wherein the cover in the first state defines a guide surface configured to guide the sheet conveyed through the first path to a position above the discharge tray.

13. An image forming apparatus, comprising:
a main casing including an image forming unit and a discharge tray; and
an optional device including a roller configured to convey a sheet conveyed from the main casing through an optional path in the optional device, the optional device being configured to be removably attached to the main casing, the optional device having a first side and a second side that is opposite from the first side, the first side extending in a first direction,
wherein the main casing includes:
a conveying path through which a sheet is conveyed from the image forming unit;
a discharge roller configured to discharge a sheet in a discharge direction toward the discharge tray;
a discharge path including a first discharge path through which the sheet is conveyed toward the discharge tray, and a second discharge path through which the sheet is conveyed toward the optional device via a first opening formed in the main casing, the discharge path diverging from the conveying path; and
a return path including a first path through which the sheet is conveyed temporarily out of the main casing and the optional device and along the first side of the optional device in the first direction via a second opening formed in the main casing, and a second path through which the sheet is conveyed toward the image forming unit,
the first path diverging from the conveying path, the second path diverging from the first path, and
wherein when the optional device is removably attached to the main casing, the optional device is disposed downstream to the second opening in the discharge direction and includes an optional discharge tray that extends from the second side.

14. The image forming apparatus according to claim 13, further comprising a cover configured, when the optional device is removed from the main casing, to selectively change between a first state in which the cover covers the first opening and the second opening and a second state in which the cover uncovers the first opening and the second opening and the optional device is attachable, wherein the cover in the first state defines a guide surface configured to guide the sheet conveyed through the first path to a position above the discharge tray.

15. The image forming apparatus according to claim 14, wherein the cover in the second state faces the optional device with the second opening between the cover and the optional device.

16. The image forming apparatus according to claim 15, wherein the cover includes a first extension extendable from the cover, the first extension facing the optional device when the cover is in the second state.

17. The image forming apparatus according to claim 13, wherein the optional device further includes a unit casing, and the unit casing includes an inclined surface disposed between the first opening and the second opening in the discharge direction, the inclined surface is angled, relative to the conveying path, in a direction away from the optional device from a bottom end of the inclined surface toward a top end of the inclined surface.

* * * * *